Dec. 31, 1929. E. R. HORNBECK ET AL 1,741,629
TUG WHEEL CLUTCH
Filed Dec. 26, 1928   2 Sheets-Sheet 1

E. R. Hornbeck,
H. K. Holt, Inventors

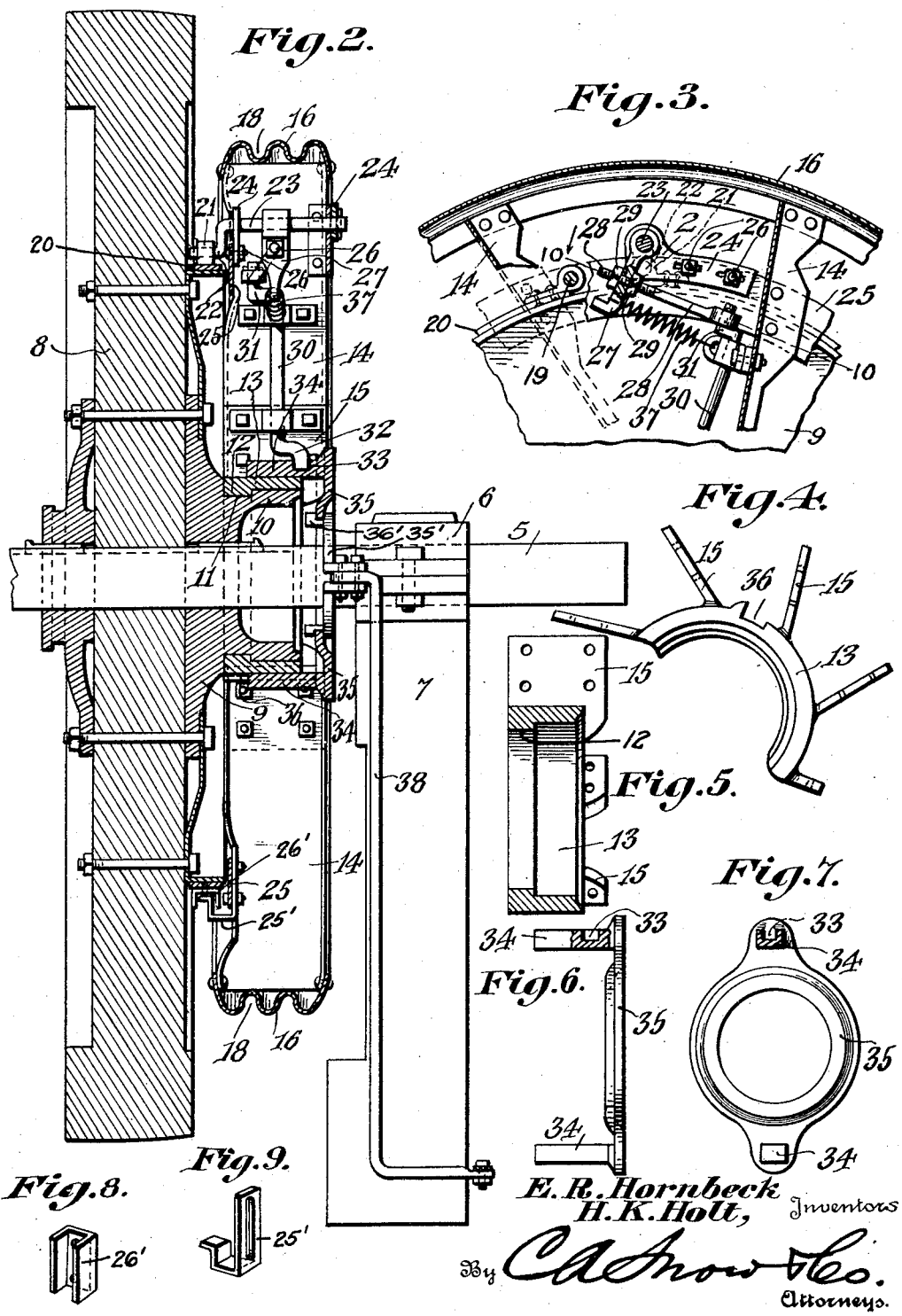

Patented Dec. 31, 1929

1,741,629

UNITED STATES PATENT OFFICE

EVERETT RAYMOND HORNBECK AND HENRY KENNETH HOLT, OF CISCO, TEXAS

TUG-WHEEL CLUTCH

Application filed December 26, 1928. Serial No. 328,547.

This invention relates to a clutch especially designed for use in connection with the tug wheels of standard rig irons, the primary object of the invention being to provide means for clutching a tug wheel to the band wheel to the end that the bull ropes operating over the tug wheel will be relieved of undue wear.

Another object of the invention is to provied a device of this character which may be readily and easily operated while the rig is in operation eliminating the necessity of stopping the mechanism to operate the clutch.

A further object of the invention is to provide a clutch of the band type, novel means being provided for adjusting the band with respect to the clutch drum to insure efficiency in operation at all times.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:
Figure 1 is an elevational view of a band wheel and tug wheel of a standard rig.

Figure 2 is a vertical sectional view therethrough.

Figure 3 is an enlarged sectional view illustrating one portion of the tug wheel.

Figure 4 is an elevational view showing one section of the hub of the tug wheel.

Figure 5 is a sectional view through the hub section.
Figure 6 is an elevational view of the operating ring.

Figure 7 is a rear elevational view thereof, one of the arms of the ring being shown in section.

Figure 8 is a perspective view of one of the U shaped clutch band supporting devices.

Figure 9 is a perspective view of one of the retainers cooperating with the U shaped members.

Figures 1, 10:
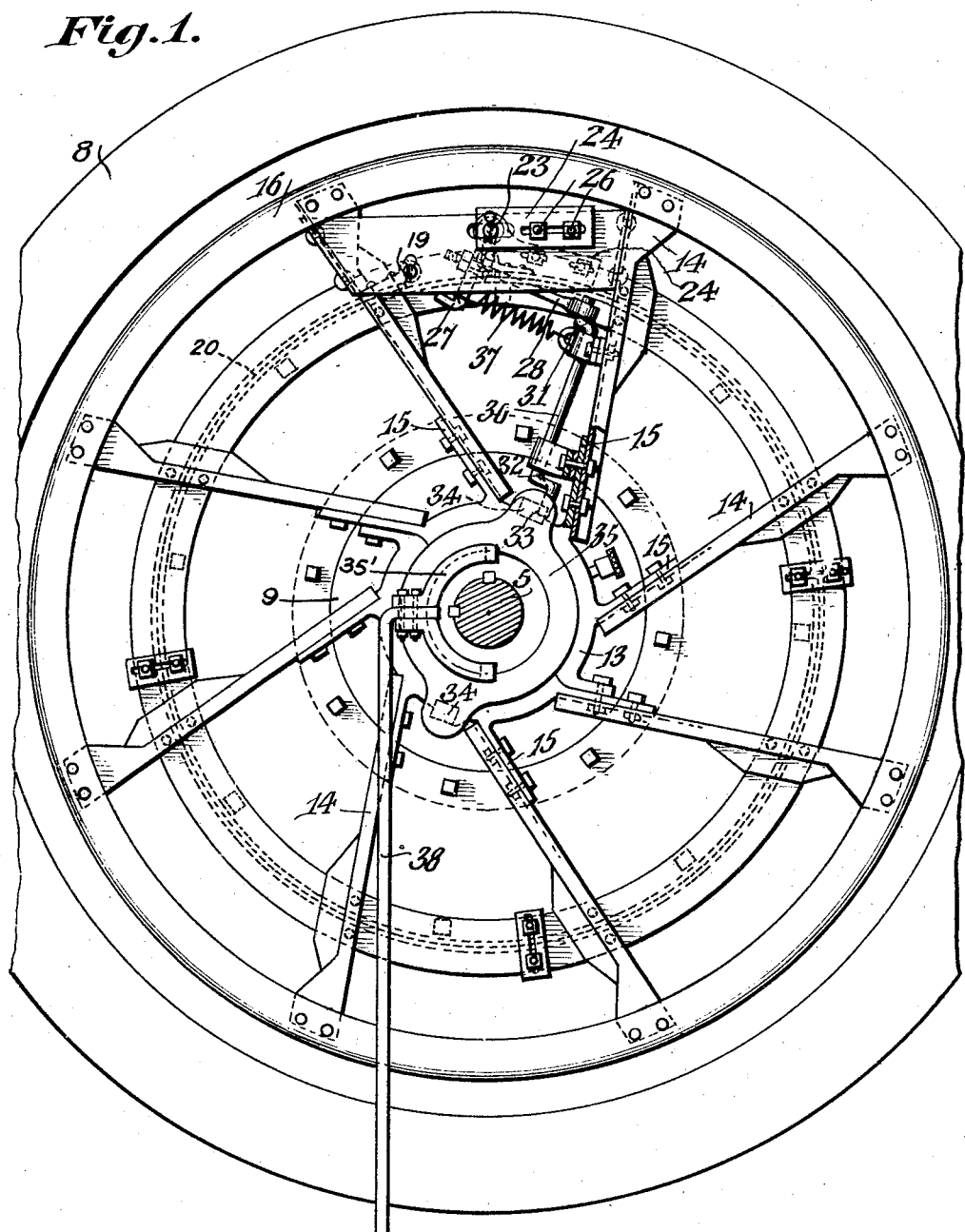
Figure 10 is a sectional view taken on line 10—10 of Figure 3.

Referring to the drawings in detail, the reference character 5 designates the band wheel shaft of the rig, which is mounted in the bearing 6 at the top of the jack post 7, it being understood that a number of these jack posts are employed for supporting the band wheel shaft.

Keyed to the shaft 5 is the band wheel 8 to which the clutch drum 9 is secured, the clutch drum extending laterally from the band wheel, as clearly shown by Figure 2 of the drawings. The reference character 10 indicates the hub of the band wheel, which is provided with a groove 11 in which the circular enlargement 12 is disposed, the circular enlargement 12 forming a part of the tug wheel hub 13.

Spokes 14 are bolted to the extensions 15 of the hub 13, the spokes being relatively wide as clearly shown by Figure 2 of the drawings. These spokes 14 are connected at their outer ends by means of the rim 16 which is provided with flanges to which the sides of the spokes are bolted. Cable grooves 18 are provided in the rim 16, in which the bull cables of the rig operate.

The reference character 19 designates a laterally extended pin secured to one of the spokes of the tug wheel to which one end of the clutch band 20 is secured, the opposite end of the clutch band being supplied with a bearing member 21 formed with an opening to receive the right angled end 22 of the operating rod 23 which in turn is mounted in suitable bearings in the plates 24 which are adjustably supported on the supporting rings 25, by means of the bolts 26 that are disposed in elongated openings formed in the plates 24, which supporting rings act as supports for various elements of the clutch. Secured to one of the supportings of the tug wheel, are fingers 25' that have right angled end portions fitted in the U shaped members 26' that are secured to the clutch band 20, to hold the clutch band against twisting or lateral movement when in operation.

Secured to the operating rod 23 and depending therefrom is an arm 27 which is formed with an opening to receive one end of the rod 28 which is adjustably connected with the operating rod 23, by means of the nuts 29. Pivotally supported on one of the spokes of the tug wheel, is a rod 30 which is formed with a right angled end 31 that extends into an opening formed at one end of the rod 28 so that upon rotary movement of the rod 30, the arm 27 will be moved to move the right angled end 22 of the operating rod 23 to move one end of the clutch band to grip or release the clutch drum, according to the direction of rotation of the operating rod.

The inner end of the rod 30 extends at right angles and has its extremity 32 fitted in the opening 33 of one of the arms 34 of the operating ring 35, the arms 34 sliding in the grooves 36 of the tug wheel hub 13, so that they will rotate therewith but be permitted to slide over the hub 13.

A coiled spring 37 has connection with the arm 27 and acts to urge the arm rearwardly to normally hold the clutch band out of engagement with the clutch drum. A controlling lever indicated by the reference character 38 connects with the ring 35 through the medium of the yoke 35' that has inwardly extended fingers 36' formed with notches to receive the edge of the ring 35 so that by movement of the control lever, the ring may be moved along the band wheel shaft 5 to operate the clutch band.

From the foregoing it will be obvious that when it is desired to clutch the tug wheel to the band wheel, the control lever 38 is operated to rotate the rod 30, which in turn imparts rotary movement to the operating rod 23 that moves the clutch band into close engagement with the clutch drum.

With the clutch in this position, it is obvious that the tug wheel will be rotated with the power or band wheel.

We claim:

1. In a device of the character described, a power wheel, a clutch drum secured to the power wheel, said power wheel having a hub, said hub having a groove, a tug wheel including a hub fitted on the hub of the power wheel, the last mentioned hub having an enlargement operating in the groove, an operating ring slidably mounted on the hub of the tug wheel, a clutch band carried by the tug wheel, said clutch band surrounding the clutch drum, an operating rod for operating the clutch band to cause it to grip the clutch drum, a rod having one end connected with the operating ring, means for transmitting movement of the rod to the operating rod when the ring is moved over the hub of the tug wheel, and means for operating the ring.

2. In a device of the character described, a power wheel, a clutch drum on the power wheel, a tug wheel associated with the power wheel, a clutch band carried by the tug wheel and adapted to grip the clutch drum to lock the tug wheel and power wheel together, an operating rod pivotally supported on the tug wheel and having a right angled end, means for securing the right angled end of the operating rod to the clutch band, an arm extending from the operating rod, a rod having a right angled end, supported adjacent to the arm, means for adjustably connecting the arm and last mentioned rod, and means connected with the right angled end of the last mentioned rod for operating the rod to move the operating rod and clutch band.

In testimony that we claim the foregoing as our own, we have hereto affixed our signatures.

EVERETT RAYMOND HORNBECK.
HENRY KENNETH HOLT.